(12) United States Patent
Lee et al.

(10) Patent No.: US 12,112,876 B2
(45) Date of Patent: Oct. 8, 2024

(54) MAGNETIC CORE USING COMPOSITE MATERIAL

(71) Applicant: LG INNOTEK CO., LTD., Seoul (KR)

(72) Inventors: Mi Jin Lee, Seoul (KR); In Ho Jeon, Seoul (KR); Sang Won Lee, Seoul (KR); Seok Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 723 days.

(21) Appl. No.: 17/291,755

(22) PCT Filed: Nov. 15, 2019

(86) PCT No.: PCT/KR2019/015649
§ 371 (c)(1),
(2) Date: May 6, 2021

(87) PCT Pub. No.: WO2020/101427
PCT Pub. Date: May 22, 2020

(65) Prior Publication Data
US 2022/0028595 A1  Jan. 27, 2022

(30) Foreign Application Priority Data

Nov. 16, 2018 (KR) .................. 10-2018-0141552
Jan. 22, 2019 (KR) .................. 10-2019-0008200

(51) Int. Cl.
*H01F 27/255* (2006.01)
*H01F 1/34* (2006.01)

(52) U.S. Cl.
CPC .......... *H01F 27/255* (2013.01); *H01F 1/344* (2013.01); *Y10T 428/32* (2015.01)

(58) Field of Classification Search
None
See application file for complete search history.

(56) References Cited

U.S. PATENT DOCUMENTS 5,817,250 A * 10/1998 Mauczok ............... H01Q 17/00
                                                    252/62.62
6,440,323 B1 * 8/2002 Kobayashi ............. H01F 1/344
                                                    252/62.62
(Continued)

FOREIGN PATENT DOCUMENTS

CN      101056729      10/2007
CN      104550940      4/2015
(Continued)

OTHER PUBLICATIONS

Abstract Translation of JP 07169613 A (Year: 1995).*
(Continued)

*Primary Examiner* — Kevin M Bernatz
(74) *Attorney, Agent, or Firm* — KED & Associates LLP

(57) ABSTRACT

The present invention relates to a magnetic core using a different type of magnetic material. The magnetic core according to one embodiment may comprise: a ferrite powder comprising manganese (Mn), zinc, iron, and oxygen (O); and a metal alloy powder made of at least two substances from among nickel (Ni), iron (Fe), aluminum (Al), molybdenum (Mo), and silicon (Si). Here, the magnetic core can comprise 67 to 72 wt % of the ferrite powder and 28 to 33 wt % of the metal alloy powder.

7 Claims, 9 Drawing Sheets

(56) References Cited

U.S. PATENT DOCUMENTS

| | | | |
|---|---|---|---|
| 11,459,646 B2* | 10/2022 | Imaoka | B22F 3/00 |
| 2005/0030143 A9* | 2/2005 | Satoh | A61B 8/145 |
| | | | 336/200 |
| 2010/0078587 A1 | 4/2010 | Mori et al. | |
| 2011/0279217 A1* | 11/2011 | Yoshida | C04B 35/62645 |
| | | | 336/233 |
| 2012/0286920 A1* | 11/2012 | Chen | H01F 1/344 |
| | | | 977/932 |
| 2015/0116950 A1* | 4/2015 | Yoo | H01F 27/2804 |
| | | | 361/728 |
| 2016/0163448 A1* | 6/2016 | Matsuura | H01F 27/24 |
| | | | 419/66 |
| 2016/0322140 A1* | 11/2016 | Awan | C01G 53/40 |
| 2019/0206780 A1* | 7/2019 | Chatterjee | H01L 23/49866 |
| 2020/0251263 A1* | 8/2020 | Kojima | C01G 49/0072 |
| 2021/0202167 A1* | 7/2021 | Asako | C01G 53/40 |
| 2023/0078286 A1* | 3/2023 | Mikami | H01F 1/37 |
| | | | 252/62.54 |

FOREIGN PATENT DOCUMENTS

| | | | | |
|---|---|---|---|---|
| GB | 2284102 A | * | 5/1995 | ............ H01F 1/344 |
| JP | H02158107 | | 6/1990 | |
| JP | 07169613 A | * | 7/1995 | ............ H01F 1/344 |
| JP | 2000-286119 | | 10/2000 | |
| JP | 2013-241284 | | 12/2013 | |
| KR | 10-0305328 | | 11/2001 | |
| KR | 10-2013-0134970 | | 12/2013 | |
| KR | 10-2014-0082597 | | 7/2014 | |
| KR | 10-1822299 | | 1/2018 | |
| KR | 10-2018-0024928 | | 3/2018 | |

OTHER PUBLICATIONS

Yoon et al. "Synthesis, microstructure, and magnetic properties of monosized Mn x Zn y Fe3—x—y04. ferrite nanocrystals", Nanoscale Research Letter, Dec. 13, p. 1-p. 5.

* cited by examiner

MAGNETIC CORE USING COMPOSITE MATERIAL

CROSS-REFERENCE TO RELATED PATENT APPLICATIONS

This application is a U.S. National Stage Application under 35 U.S.C. § 371 of PCT Application No. PCT/KR2019/015649, filed Nov. 15, 2019, which claims priority to Korean Patent Application Nos. 10-2018-0141552, filed Nov. 16, 2018 and 10-2019-0008200, filed Jan. 22, 2019, whose entire disclosures are hereby incorporated by reference.

TECHNICAL FIELD

Embodiments relate to a magnetic core using different kinds of magnetic materials.

BACKGROUND ART

With recent development of the electronics industry, importance of a power supply unit configured to supply power to various kinds of electronic devices has come to the fore. For a power metal-oxide-semiconductor field-effect transistor (MOSFET) constituted by a semiconductor device in the power supply unit, an integrated circuit (IC) usable even within a frequency range of 1 MHz has been developed due to improvement in high-integration technology, and each of a capacitor, an inductor, and a resister used in a circuit of the power supply unit has also been developed in the form of a chip.

Meanwhile, with an increase in number of vehicles equipped with electric motors for driving, development of power electronic (PE) parts for vehicles has been accelerated. A representative one of the power electronic parts for vehicles is a DC-DC converter. In a vehicle using an electric motor as a power source, a high-voltage battery configured to drive the electric motor and an auxiliary battery configured to supply power to electric loads are generally provided together. The auxiliary battery may be charged with power from the high-voltage battery. In order to charge the auxiliary battery, it is necessary to convert direct-current power of the high-voltage battery into direct-current power corresponding to voltage of the auxiliary battery. To this end, the DC-DC converter may be used.

The DC-DC converter converts direct-current power into alternating-current power, transforms the alternating-current power through a transformer, and rectifies the transformed power in order to output direct-current power having desired voltage. Consequently, a passive device configured to be operated at a high frequency, such as an inductor, is mounted in the DC-DC converter.

A magnetic core constituting an inductor or a transformer that is applied to power electronic parts for vehicles as well as a power supply unit of a general electronic device is made of a Mn—Zn-based ferrite material. However, the magnetic characteristic of the ferrite material easily disappears even at 300° C. or less, and the resonance point of the ferrite material is also relatively low, whereby the frequency characteristic of the ferrite material is abruptly reduced at a high frequency of 1 MHz or higher. As a result, the magnetic core is not appropriate as a part that is applied to an environment in which heat is frequently generated due to high output and an operating frequency of higher than 1 MHz is required.

DISCLOSURE

Technical Problem

Embodiments provide a magnetic core having an excellent frequency characteristic within a high-frequency range.

In addition, embodiments provide a magnetic core having a magnetic characteristic maintained even at a high temperature.

Furthermore, embodiments provide a magnetic core having high power reception capacity within a high-frequency range.

Objects of embodiments are not limited to the aforementioned objects, and other unmentioned objects will be clearly understood by those skilled in the art based on the following description.

Technical Solution

In one embodiment, a magnetic core includes ferrite powder including 67% of manganese (Mn), 23% of zinc (Zn), 9% of iron (Fe), and the remainder of oxygen (O) and metal-alloy powder including two or more of nickel (Ni), iron (Fe), aluminum (Al), molybdenum (Mo), and silicon (Si). Here, the magnetic core may include 67 wt % to 72 wt % of the ferrite powder and 28 wt % to 33 wt % of the metal-alloy powder.

For example, the difference in molar ratio between the ferrite powder and the metal-alloy powder may be less than 5% point.

For example, the ferrite powder may include $Mn_{0.67}Zn_{0.23}Fe_{2.09}O_4$.

For example, the metal-alloy powder may include molybdenum permalloy powder (MPP) ($Ni_{0.79}Fe_{0.16}Mo_{0.05}$).

For example, the metal-alloy powder may include at least one of FeNi, FeSi, FeAlSi, and NiFeMo.

For example, the magnetic core according may further include a nonmagnetic additive.

For example, the nonmagnetic additive may include at least one of silicon oxide ($SiO_2$), calcium oxide (CaO), tantalum pentoxide ($Ta_2O_5$), niobium pentoxide ($Nb_2O_5$), and vanadium pentoxide ($V_2O_5$).

For example, the magnetic core may have a Curie temperature of 300° C. or higher.

For example, the magnetic core may have a resonance frequency of 1 MHz or higher.

In another embodiment, a magnetic core includes first ferrite powder including manganese (Mn), zinc (Zn), iron (Fe), and oxygen (O) and second ferrite powder including nickel (Ni), zinc (Zn), iron (Fe), and oxygen (O), wherein the difference in molar ratio between the first ferrite powder and the second ferrite powder is less than 5% point.

For example, the first ferrite powder may include $Mn_{0.67}Zn_{0.23}Fe_{2.09}O_4$.

For example, the second ferrite powder may include $Ni_{0.6}Zn_{0.4}Fe_2O_4$.

For example, the magnetic core according may further include a nonmagnetic additive.

For example, the nonmagnetic additive may include at least one of silicon oxide ($SiO_2$), calcium oxide (CaO), tantalum pentoxide ($Ta_2O_5$), niobium pentoxide ($Nb_2O_5$), and vanadium pentoxide ($V_2O_5$).

For example, the magnetic core may have a resonance frequency of 1 MHz or higher.

Advantageous Effects

A magnetic core according to an embodiment may have both excellent direct-current bias performance of a ferrite-based material based on high saturation magnetic flux density thereof and heat resistance and high-frequency characteristics of a metal-based material.

In addition, a magnetic core according to another embodiment includes different kinds of ferrite-based materials, whereby the frequency characteristic and power reception capacity thereof within a high-frequency range are excellent.

It should be noted that the effects of embodiments are not limited to the effects mentioned above, and other unmentioned effects will be clearly understood by those skilled in the art from the following description.

BEST MODE

Figure 1:
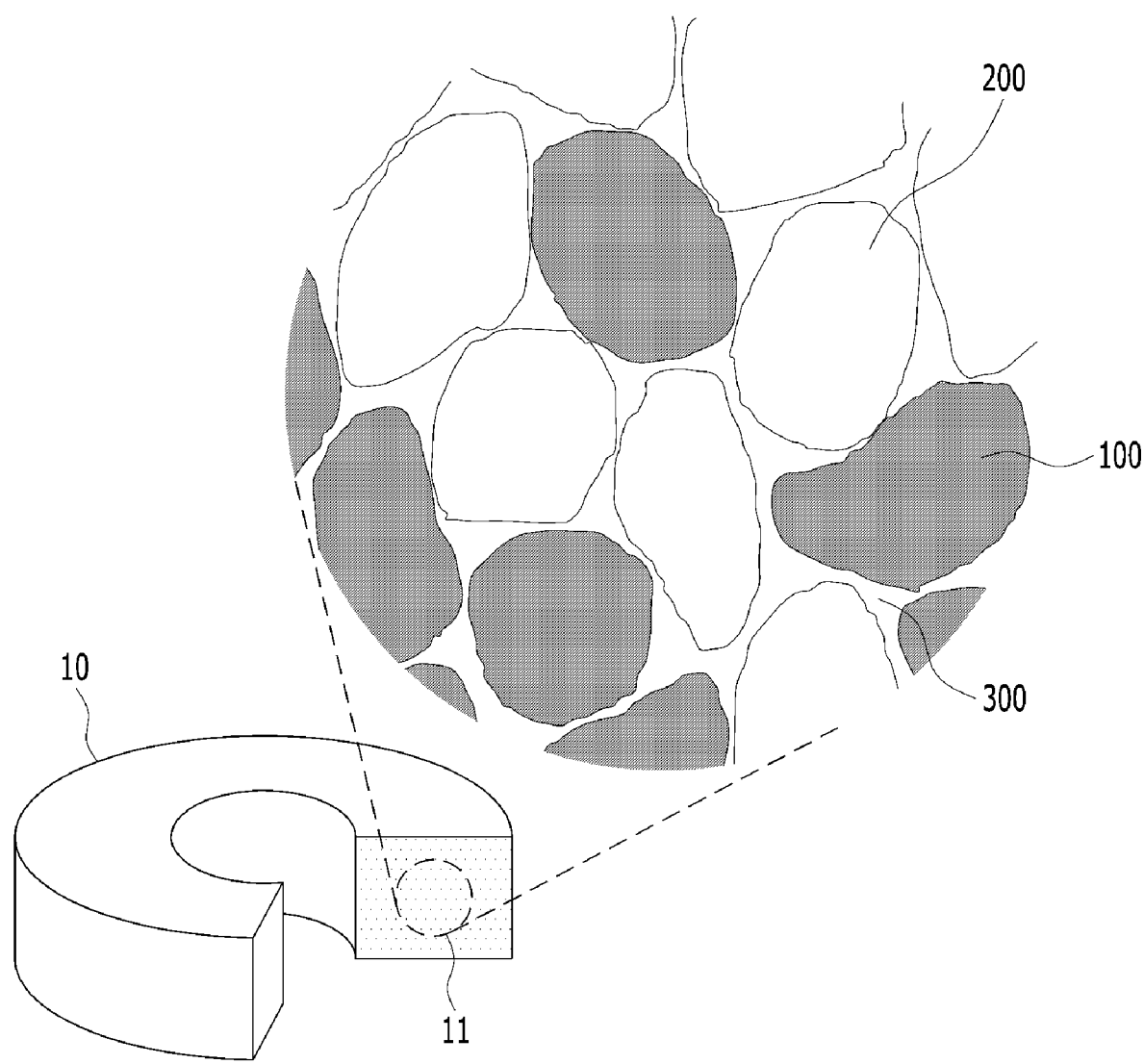
FIG. 1 shows an example of the binding form of materials constituting a magnetic core according to an embodiment.

The present disclosure may be changed in various manners and may have various embodiments, wherein specific embodiments will be described with reference to the drawings. However, the present disclosure is not limited to the specific embodiments, and it should be understood that the present disclosure includes all modifications, equivalents, or substitutions included in the idea and technical scope of the present disclosure.

Although terms including ordinal numbers, such as "first" and "second," may be used herein to describe various components, these components should not be limited by these terms. These terms are only used to distinguish one component from another component. For example, a first element could be termed a second element, and, similarly, a second element could be termed a first element, without departing from the scope of the present disclosure. The term "and/or" includes any and all combinations of one or more of the associated listed items.

It should be understood that, when a component is referred to as being "connected to" or "coupled to" another component, it may be directly connected to or coupled to another component or intervening components may be present. In contrast, it should be understood that, when a component is referred to as being "directly connected to" or "directly coupled to" another component, there are no intervening components present.

In the following description of the embodiments, it will be understood that, when an element, such as a layer (film), a region, a pattern, or a structure is referred to as being "on" or "under" another element, such as a substrate, a layer (film), a region, a pad, or a pattern, it can be "directly" on or under another element or can be "indirectly" formed such that an intervening element is also present. Terms such as "on" or "under" will be described on the basis of the drawings. Also, in the drawings, the thickness or size of a layer (film), a region, a pattern, or a structure may be changed for convenience of description and clarity, and therefore the size thereof does not entirely reflect the actual size thereof.

The terms used in the present application are provided only to described specific embodiments, and do not limit the present disclosure. Singular forms are intended to include plural forms as well, unless the context clearly indicates otherwise. In the present application, it should be understood that the terms "includes," "has," etc. specify the presence of stated features, numbers, steps, operations, elements, components, or combinations thereof, but do not preclude the presence or addition of one or more other features, numbers, steps, operations, elements, components, or combinations thereof.

All terms, including technical and scientific terms, have the same meanings as those commonly understood by one of ordinary skill in the art to which this disclosure pertains, unless otherwise defined. Commonly used terms, such as those defined in typical dictionaries, should be interpreted as being consistent with the contextual meaning of the relevant art, and are not to be construed in an ideal or overly formal sense unless expressly defined to the contrary.

In one embodiment, there is provided a magnetic core including a ferrite-based material and a metal-based material.

In one aspect of this embodiment, the ferrite-based material may be a Mn—Zn-based ferrite. For example, the ferrite-based material may be $MnZnFe_2O_4$.

The metal-based material may be an alloy material including two or more of nickel (Ni), iron (Fe), aluminum (Al), molybdenum (Mo), and silicon (Si). For example, the metal-based material may be permalloy (FeNi), ferrosilicon (FeSi), FeAlSi, or NiFeMo.

Also, in one aspect of this embodiment, the ferrite-based material and the metal-based material may have the same molar ratios in order to constitute a magnetic core.

Also, in one aspect of this embodiment, a microscopic powder type ferrite-based material and a microscopic powder type metal-based material may be mixed with a non-magnetic additive and may then be thermally treated so as to be manufactured as a magnetic core.

Hereinafter, the composition and characteristics of a magnetic core according to an embodiment will be described in detail with reference to the accompanying drawings. Identical or corresponding components will be denoted by the same reference numerals irrespective of the drawings, and a duplicate description thereof will be omitted.

First, the main composition of the magnetic core according to the embodiment will be described with reference to Tables 1 and 2 below.

TABLE 1

| Category | Composite | Content ratio (molar ratio %) | Content ratio (wt %) |
|---|---|---|---|
| Main composition | $Mn_{0.67}Zn_{0.23}Fe_{2.09}O_4$ | 50% | 67 to 72% |
| | $Ni_{0.79}Fe_{0.16}Mo_{0.05}$ | 50% | 28 to 33% |

TABLE 1-continued

| Category | Composite | Content ratio (molar ratio %) | Content ratio (wt %) |
|---|---|---|---|
| (Magnetic Powder) | Total | 100% | — |

Referring to Table 1, the magnetic core according to the embodiment may include $Mn_{0.67}Zn_{0.23}Fe_{2.09}O_4$ as a ferrite-based material, which is one constituent of the main composition, and molybdenum permalloy powder (MPP) ($Ni_{0.79}Fe_{0.16}Mo_{0.05}$) as a metal-alloy-based material, which is the other constituent of the main composition. Here, $Mn_{0.67}Zn_{0.23}Fe_{2.09}O_4$ may be a material including 67% of manganese (Mn), 23% of zinc (Zn), 9% of iron (Fe), and the remainder of oxygen (O).

The two materials may have the same molar ratios. That is, the molar ratio of each of the two materials may be 50%. Also, in terms of weight ratio (wt %), the magnetic core may include 67% to 72% of $Mn_{0.67}Zn_{0.23}Fe_{2.09}O_4$ and 28% to 33% of $Ni_{0.79}Fe_{0.16}Mo_{0.05}$.

Depending on embodiments, the metal-alloy-based material, $Ni_{0.79}Fe_{0.16}Mo_{0.05}$, may be replaced with $Ni_{0.81}Fe_{0.19}$, $Fe_3Al_{0.33}Si_{0.67}$, FeSi, or a mixture thereof having the same molar ratios. For example, in the case in which $Ni_{0.79}Fe_{0.16}Mo_{0.05}$ is replaced with a mixture of $Ni_{0.81}Fe_{0.19}$, $Fe_3Al_{0.33}Si_{0.67}$, and FeSi, the composition shown in Table 2 below, including $Mn_{0.67}Zn_{0.23}Fe_{2.09}O_4$, may be provided.

TABLE 2

| Category | | Composite | Content ratio (molar ratio %) |
|---|---|---|---|
| Mn—Zn ferrite Powder + Metal alloy Powder | Main composition | $Mn_{0.67}Zn_{0.23}Fe_{2.09}O_4$ | 50% |
| | | $Ni_{81}Fe_{19}$ | 15.60% |
| | | $Ni_{79}Fe_{16}Mo_5$ | 14.40% |
| | | $Fe_3Al_{0.33}Si_{0.67}$ | 10% |
| | | FeSi | 10% |
| | | Total | 100% |

Of course, the ratios between the metal alloys shown in Table 2 are illustrative. In another embodiment, the relative ratios may be changed within a range within which a total molar ratio is maintained, and at least some metal alloys may be excluded. Next, the nonmagnetic additive will be described with reference to Table 3 below.

TABLE 3

| Category | Composite | Content concentration (ppm based on 1 kg) | Content ratio (wt %) |
|---|---|---|---|
| Nonmagnetic additive | $SiO_2$ | 80 to 120 ppm | <0.1% |
| | CaO | 80 to 100 ppm | <0.1% |
| | $Ta_2O_5$ | 300 to 400 ppm | <0.1% |
| | $Nb_2O_5$ | 200 to 300 ppm | <0.1% |
| | $V_2O_5$ | 200 to 300 ppm | <0.1% |

Referring to Table 3, the magnetic core according to the embodiment may include at least one of silicon oxide ($SiO_2$), calcium oxide (CaO), tantalum pentoxide ($Ta_2O_5$), niobium pentoxide ($Nb_2O_5$), and vanadium pentoxide ($V_2O_5$), each of which is a nonmagnetic additive, in addition to the main composition. The nonmagnetic additive may serve to maintain force of binding between the ferrite-based powder and the metal-ally-based powder after heat treatment. A method of manufacturing the magnetic core having the above-described composition is as follows.

First, ferrite-based powder and metal-alloy-based powder having a particle size of several μm to several tens of μm are prepared so as to have the same molar ratios. Each powder may be manufactured by water atomization or gas atomization. However, the present disclosure is not limited thereto.

The nonmagnetic additive shown in Table 3 is uniformly mixed therewith, and the mixture is shaped at a high pressure (e.g. 10 to 20 tons/cm$^2$) to form a magnetic core having a desired shape. The magnetic core may be a toroidal-type core, an E-type core, a pq-type core, an EPC-type core, or an I-type core. However, the present disclosure is not limited thereto.

The magnetic core formed through high-pressure shaping may be thermally treated at a high temperature (e.g. 600° C. or higher) for a predetermined time in order to remove residual stress and deformation therefrom.

The disposition state of the composites of the magnetic core formed as the result of heat treatment is shown in FIG. 1.

FIG. 1 shows an example of the binding form of materials constituting a magnetic core according to an embodiment. In FIG. 1, there is shown an enlarged shape of one section 11 of a toroidal-type magnetic core 10.

Referring to FIG. 1, in the magnetic core 10 according to the embodiment, particles of ferrite-based powder 100 and metal-alloy-based powder 200 are mixed with each other, and the space between the two kinds of particles is filled with a nonmagnetic additive 300. Due to binding between such micrometer-sized particles, the magnetic core according to the embodiment has a uniform magnetic characteristic and high mechanical strength, compared to a structure in which cores each made of a general ferrite-based material and cores each made of a metal-alloy-based material are alternately stacked.

In the magnetic core according to the embodiment, individual particles are mixed with each other in the state in which inherent characteristics thereof are maintained without being synthesized into a third material through reaction even after high-pressure shaping and heat treatment are performed. This state may be verified through X-ray diffraction (XRD) analysis.

Figure 2:
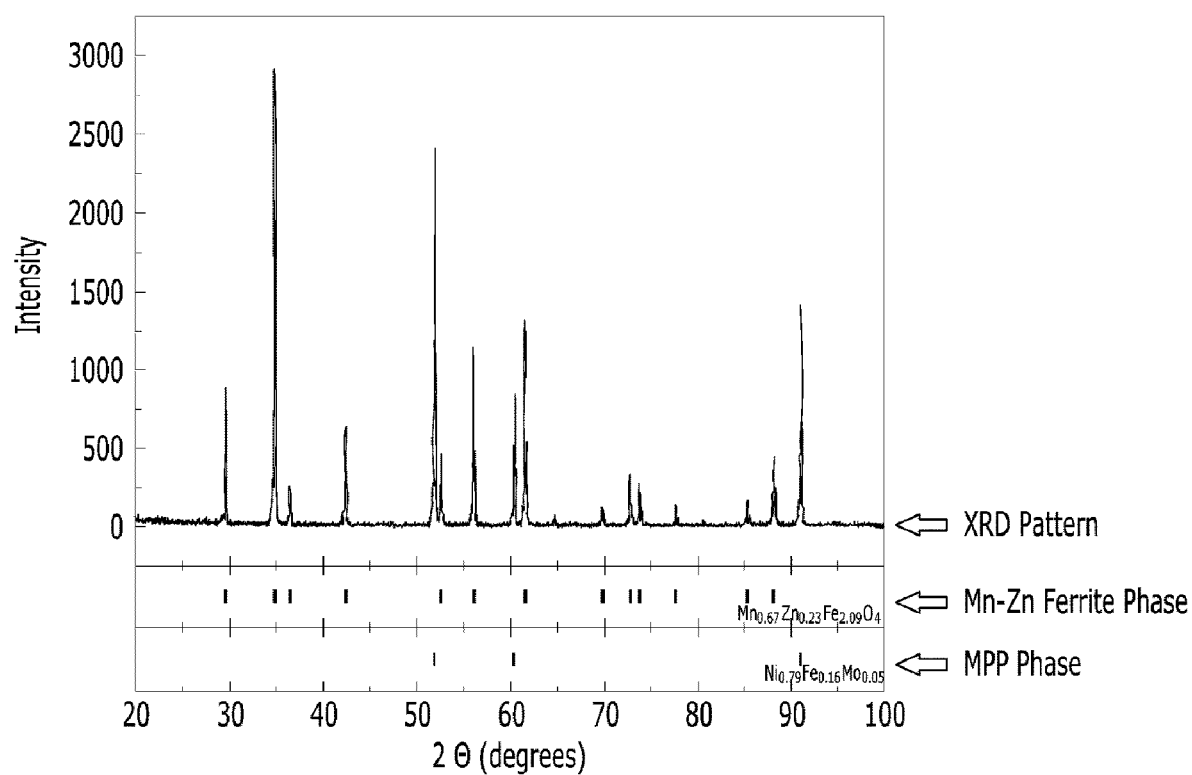
FIG. 2 shows an example of the result of X-ray diffraction analysis of the magnetic core according to the embodiment.

FIG. 2 shows an example of the result of X-ray diffraction analysis of the magnetic core according to the embodiment.

In FIG. 2, there is shown an X-ray diffraction analysis graph of the magnetic core according to the embodiment. This result is the result of analysis of a magnetic core formed by mixing $Mn_{0.67}Zn_{0.23}Fe_{2.09}O_4$ and MPP ($Ni_{0.79}Fe_{0.16}Mo_{0.05}$) with each other so as to have the same molar ratios and shaping the mixture.

Referring to FIG. 2, it can be seen that the Mn—Zn ferrite phase and the MPP phase are simultaneously detected in an XRD pattern, which means that the two materials are mixed with each other in the state of not being denatured without forming a third phase through reaction therebetween.

Hereinafter, various characteristics of the magnetic core according to the embodiment will be described with reference to FIGS. 3 to 6 so as to be compared with comparative examples. In the following description, a first comparative example is a magnetic core using a general Mn—Zn ferrite without a metal alloy, a second comparative example is a magnetic core using a general metal alloy without a Mn—Zn ferrite, and the embodiment is a magnetic core formed by mixing $Mn_{0.67}Zn_{0.23}Fe_{2.09}O_4$ and MPP($Ni_{0.79}Fe_{0.16}Mo_{0.05}$) with each other so as to have the same molar ratios and shaping the mixture.

First, a high-temperature characteristic will be described with reference to FIG. 3.

Figure 3:
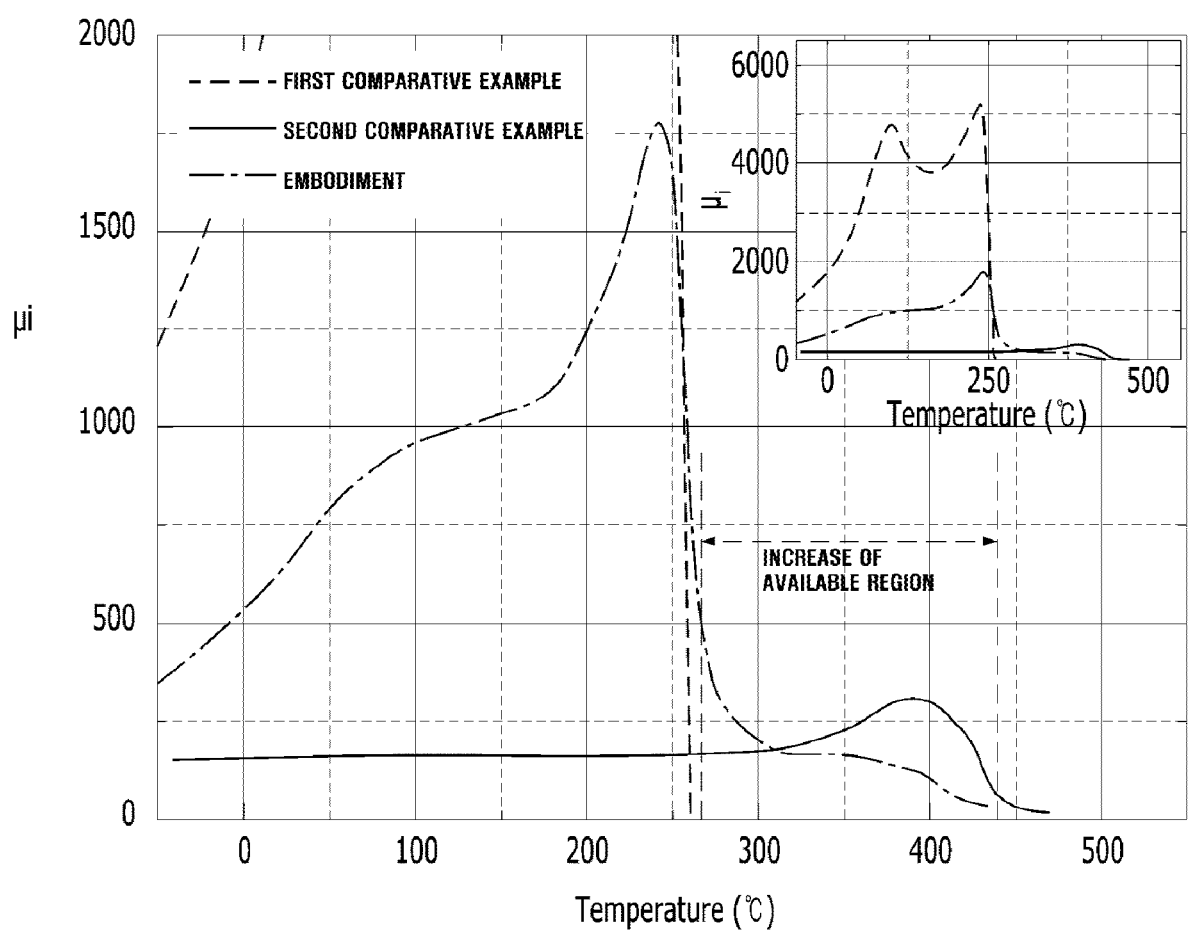
FIG. 3 is a graph illustrating the high-temperature characteristic of the magnetic core according to the embodiment.

FIG. 3 is a graph illustrating the high-temperature characteristic of the magnetic core according to the embodiment. In FIG. 3, the horizontal axis indicates temperature, and the vertical axis indicates initial permeability (pi).

Referring to FIG. 3, the magnetic characteristic of the magnetic core according to the first comparative example substantially disappears at 250° C. or higher. This results from the fact that the Curie temperature of the Mn—Zn ferrite is low. In addition, the magnetic core according to the second comparative example has a relatively uniform magnetic characteristic even at 400° C. or higher but has excessively low initial permeability even at a low temperature. In contrast, the magnetic core according to the embodiment maintains an initial permeability of 500 or more at 250° C. or lower, and has a meaningful magnetic characteristic at a high temperature of 300° C. or higher, since Curie temperature thereof exceeds 300° C. Consequently, the magnetic core according to the embodiment has high initial permeability at a low temperature, compared to the second comparative example, and has a characteristic in which an available region thereof is increased in a high temperature, compared to the first comparative example.

Next, a high-frequency characteristic will be described with reference to FIG. 4.

Figure 4:
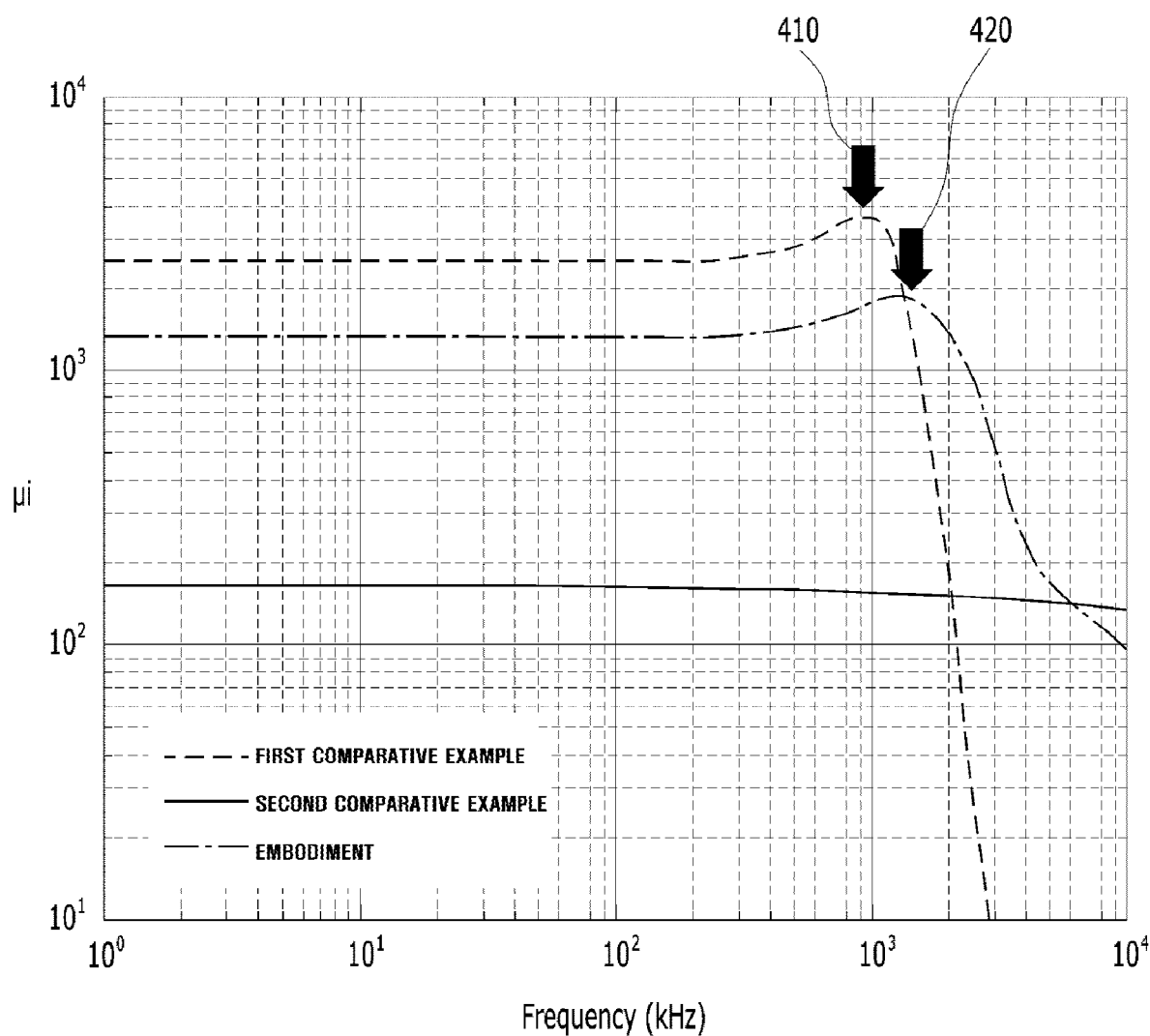
FIG. 4 is a graph illustrating the high-frequency characteristic of the magnetic core according to the embodiment.

FIG. 4 is a graph illustrating the high-frequency characteristic of the magnetic core according to the embodiment. In FIG. 4, the horizontal axis indicates frequency, and the vertical axis indicates initial permeability (pi).

Referring to FIG. 4, the magnetic core according to the second comparative example has relatively uniform initial permeability even at a high frequency of 1 MHz or higher, but the magnitude thereof is about half that of the first comparative example. In addition, the magnetic core according to the first comparative example has relatively excellent initial permeability at a frequency of 1 MHz or lower, but the performance thereof is abruptly reduced in a MHz range, since the resonance point thereof is located at about 1 MHz (410). In contrast, it can be seen that the resonance point of the magnetic core according to the embodiment moves farther to a high-frequency region, compared to the first comparative example, whereby the magnetic core according to the embodiment is usable even after a frequency limit point (i.e. 1 MHz), compared to a magnetic core made of a general Mn—Zn-based ferrite material, and reduction in performance due to an increase in frequency is small.

As described with reference to FIGS. 3 and 4, therefore, the magnetic core according to the embodiment is also applicable to a passive device configured to be operated at a high temperature of 300° C. or higher and a high frequency of 1 MHz or higher.

Next, direct-current (DC) bias performance will be described with reference to FIGS. 5 and 6.

Figure 5:
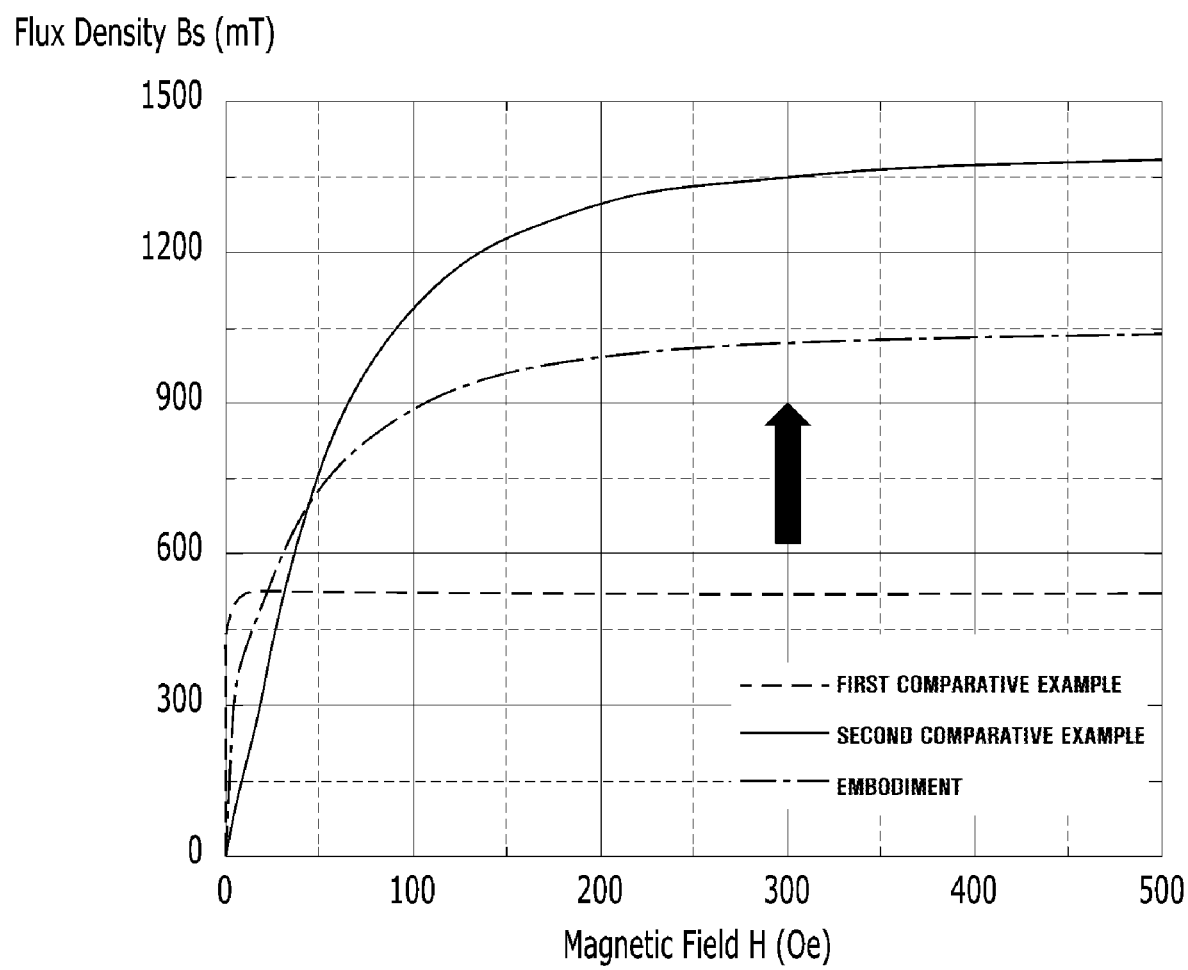
FIG. 5 is a graph illustrating the saturation magnetic flux density characteristic of the magnetic core according to the embodiment.
Figure 6:
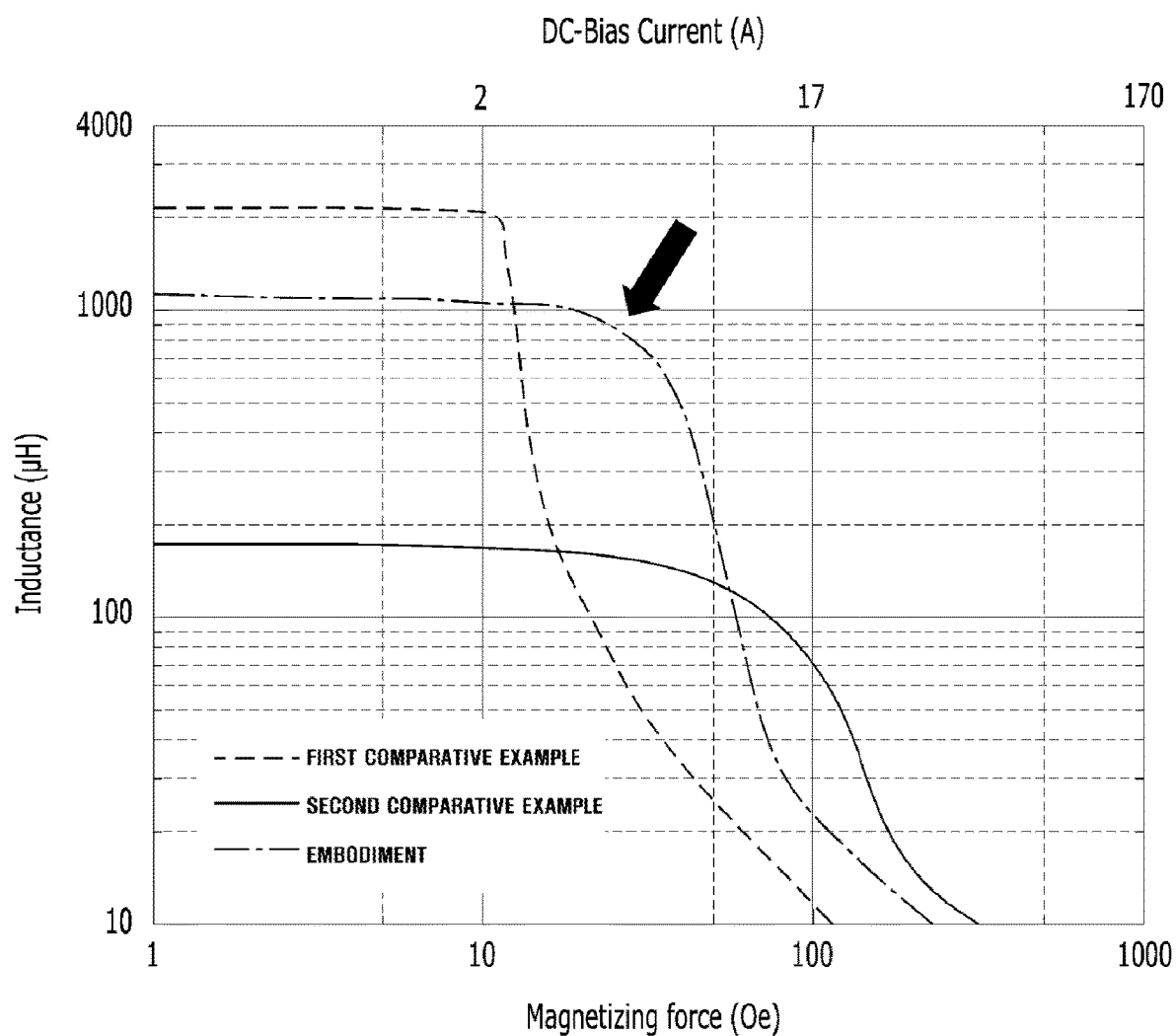
FIG. 6 is a graph illustrating the direct-current bias characteristic of the magnetic core according to the embodiment.

FIG. 5 is a graph illustrating the saturation magnetic flux density characteristic of the magnetic core according to the embodiment, and FIG. 6 is a graph illustrating the direct-current bias characteristic of the magnetic core according to the embodiment.

In FIG. 5, the horizontal axis indicates magnetic field, and the vertical axis indicates magnetic flux density. Referring to FIG. 5, it can be seen that the magnetic flux density of the magnetic core according to the embodiment is greatly increased, compared to the first comparative example, whereby saturation is not easily achieved. Consequently, high direct-current bias performance is expected. This appears more clearly in FIG. 6.

In FIG. 6, the lower end of the horizontal axis indicates magnetizing force, the upper end of the horizontal axis indicates direct-current bias current, and the vertical axis indicates inductance.

Referring to FIG. 6, it can be seen that, around an arrow, the magnetic core according to the embodiment has high inductance, compared to the magnetic core according to the second comparative example, and has improved direct-current bias performance, compared to the magnetic core according to the first comparative example. In other words, maximum current is increased, compared to the first comparative example. This means that direct-current bias performance can be improved from about 3 A to about 14 A.

Advantages of the magnetic core according to the embodiment described above may be summarized as follows.

A general Mn—Zn ferrite-based magnetic core has a low available temperature range and a low available frequency, whereas the magnetic core according to the embodiment is also applicable to a passive device configured to be operated at a high temperature of 300° C. or higher and a high frequency of 1 MHz or higher through mixing with metal-alloy powder.

Also, the magnetic flux density of the general Mn—Zn ferrite-based magnetic core is rapidly saturated due to a low Bs value, whereby the direct-current bias performance thereof is low, whereas the magnetic core according to the embodiment has higher direct-current bias performance through mixing with metal-alloy powder.

In addition, a general hybrid core formed by stacking individual magnetic cores made of different kinds of materials has low mechanical strength due to the junction between the different kinds of cores and has different magnetic characteristics depending on the position thereof, whereas the magnetic core according to the embodiment has a uniform magnetic characteristic and high mechanical strength through microscopic mixing composition.

Meanwhile, in the previous embodiment, the ferrite-based material and the metal-based material were described as being included in the magnetic core so as to have the same molar ratios. However, the present disclosure is not limited thereto. For example, depending on embodiments, the molar ratios of the ferrite-based material and the metal-based material may have a difference of less than 5% therebetween.

As an example, in the magnetic core, the molar ratio of the ferrite powder may be 52%, and the molar ratio of the metal-alloy powder may be 48%. That is, on the assumption that the sum of the molar ratio of the ferrite powder and the molar ratio of the metal-alloy powder is 100%, the difference between the molar ratios thereof is less than 5% point.

In the magnetic core, the difference between the molar ratios may be adjusted based on a characteristic necessary to be further strengthened depending on design purposes, among ferrite-based characteristics and the metal-alloy-based characteristics. For example, in the case in which the molar ratio of the ferrite powder is greater than the molar ratio of the metal-alloy powder, better initial permeability is exhibited at the same temperature and the same frequency, compared to a molar ratio of 1:1 (i.e. the same molar ratios). On the other hand, in the case in which the molar ratio of the metal-alloy powder is greater than the molar ratio of the ferrite powder, an available region moves to a higher temperature and has a higher resonance frequency than in the same molar ratios.

In another embodiment, a magnetic core including different kinds of ferrite-based materials is provided.

In one aspect of this embodiment, one ferrite-based material may be a Mn—Zn-based ferrite, and the other ferrite-based material may be a Ni—Zn-based ferrite. For example, the Mn—Zn-based ferrite material may be $MnZnFe_2O_4$, and the Ni—Zn-based ferrite material may be $NiZnFe_2O_4$. More specifically, the Mn—Zn-based ferrite material may be $Mn_{0.67}Zn_{0.23}Fe_{2.09}O_4$, and the Ni—Zn-based ferrite material may be $Ni_{0.6}Zn_{0.4}Fe_2O_4$.

Also, in one aspect of this embodiment, the different kinds of ferrite-based materials may have predetermined molar ratios in order to constitute a magnetic core. For example, the different kinds of ferrite-based materials may have the same molar ratios.

Also, in one aspect of this embodiment, different kinds of microscopic powder type ferrite-based materials may be mixed with a nonmagnetic additive and may then be thermally treated so as to manufacture a magnetic core.

Hereinafter, the composition and characteristics of a magnetic core according to another embodiment will be described in detail with reference to the accompanying drawings. Identical or corresponding components will be denoted by the same reference numerals irrespective of the drawings, and a duplicate description thereof will be omitted.

First, the composition of the magnetic core according to the other embodiment will be described with reference to Table 4 below.

TABLE 4

| Classification | Category | Constituent | Content ratio (molar ratio %) |
|---|---|---|---|
| Mn—Zn-based ferrite powder + Ni—Zn-based ferrite powder | Main composition (Magnetic powder) | $Mn_{0.67}Zn_{0.23}Fe_{2.09}O_4$ | 50% |
| | | $Ni_{0.6}Zn_{0.4}Fe_2O_4$ | 50% |
| | | Total | 100% |
| | Nonmagnetic additive | $SiO_2$ | 80 to 120 ppm |
| | | CaO | 80 to 100 ppm |
| | | $Ta_2O_5$ | 300 to 400 ppm |
| | | $Nb_2O_5$ | 200 to 300 ppm |
| | | $V_2O_5$ | 200 to 300 ppm |

Referring to Table 4, the magnetic core according to the other embodiment may include $Mn_{0.67}Zn_{0.23}Fe_{2.09}O_4$ and $Ni_{0.6}Zn_{0.4}Fe_2O_4$ as different kinds of ferrite-based materials, which are constituents of the main composition. Here, $Mn_{0.67}Zn_{0.23}Fe_{2.09}O_4$ may be a material including 67% of manganese (Mn), 23% of zinc (Zn), 9% of iron (Fe), and the remainder of oxygen (O), and $Ni_{0.6}Zn_{0.4}Fe_2O_4$ may be configured such that the ratio of nickel:zinc is 6:4. As shown in Table 4, the two ferrite materials may have the same molar ratios. That is, the molar ratio of each of the two materials may be 50%. However, the present disclosure is not limited thereto. That is, depending on embodiments, the molar ratios of the two materials may have a difference of less than 5% point. In other words, on the assumption that the sum of the molar ratios of the two materials is 100%, the difference between the molar ratios thereof is less than 5% point.

For example, in the magnetic core, the molar ratio of $Mn_{0.67}Zn_{0.23}Fe_{2.09}O_4$ may be 52%, and the molar ratio of $Ni_{0.6}Zn_{0.4}Fe_2O_4$ may be 48%. As another example, in the magnetic core, the molar ratio of $Mn_{0.67}Zn_{0.23}Fe_{2.09}O_4$ may be 49%, and the molar ratio of $Ni_{0.6}Zn_{0.4}Fe_2O_4$ may be 51%.

In the magnetic core, the difference between the molar ratios may be adjusted based on a characteristic necessary to be further strengthened depending on design purposes, among Mn—Zn ferrite-based characteristics and Ni—Zn ferrite-based characteristics. For example, in the case in which the molar ratio of the Mn—Zn ferrite powder is greater than the molar ratio of the Ni—Zn ferrite powder, better initial permeability is exhibited at the same frequency, compared to a molar ratio of 1:1 (i.e. the same molar ratios), as will be described below. On the other hand, in the case in which the molar ratio of the Ni—Zn ferrite powder is greater than the molar ratio of the Mn—Zn ferrite powder, an available region moves to a higher temperature and has a higher resonance frequency than in the same molar ratios.

In addition, as shown in Table 4, the magnetic core according to the other embodiment may include at least one of silicon oxide ($SiO_2$), calcium oxide (CaO), tantalum pentoxide ($Ta_2O_5$), niobium pentoxide ($Nb_2O_5$), and vanadium pentoxide ($V_2O_5$), each of which is a nonmagnetic additive, in addition to the main composition. The nonmagnetic additive may serve to maintain force of binding between the different kinds of ferrite-based powders after heat treatment.

A method of manufacturing the magnetic core having the above-described composition is as follows.

First, different kinds of ferrite-based powders having a particle size of several μm to several tens of μm are prepared so as to have predetermined molar ratios (e.g. the same molar ratios). Each powder may be manufactured by water atomization or gas atomization. However, the present disclosure is not limited thereto.

The nonmagnetic additive shown in Table 4 is uniformly mixed therewith, and the mixture is shaped at a high pressure (e.g. 10 to 20 tons/cm$^2$) to form a magnetic core having a desired shape. The magnetic core may be a toroidal-type core, an E-type core, a pq-type core, an EPC-type core, or an I-type core. However, the present disclosure is not limited thereto.

The magnetic core formed through high-pressure shaping may be thermally treated at a high temperature (e.g. 600° C. or higher) for a predetermined time in order to remove residual stress and deformation therefrom.

The disposition state of the composites of the magnetic core formed as the result of heat treatment may be similar to the state shown in FIG. 1. For example, in the magnetic core according to the other embodiment, particles of the Mn—Zn-based ferrite powder and the Ni—Zn-based ferrite powder are mixed with each other, and the space between the two kinds of particles is filled with a nonmagnetic additive. Due to binding between such micrometer-sized particles, the magnetic core according to the other embodiment has a uniform magnetic characteristic and high mechanical strength, compared to a structure in which general different kinds of ferrite-based materials are alternately stacked.

In the magnetic core according to the other embodiment, individual particles may be mixed with each other in the state in which inherent characteristics thereof are maintained without being synthesized into a third material through reaction even after high-pressure shaping and heat treatment are performed.

Hereinafter, various characteristics of the magnetic core according to the other embodiment will be described with reference to FIGS. 7 to 9 so as to be compared with comparative examples. In the following description, a third comparative example is a magnetic core using a general Mn—Zn ferrite without a metal alloy, a fourth comparative example is a magnetic core using a Mn—Zn ferrite, and the other embodiment is a magnetic core formed by mixing $Mn_{0.67}Zn_{0.23}Fe_{2.09}O_4$ and $Ni_{0.6}Zn_{0.4}Fe_2O_4$ with each other so as to have the same molar ratios and shaping the mixture.

First, a high-frequency characteristic will be described with reference to FIG. 7.

Figure 7:
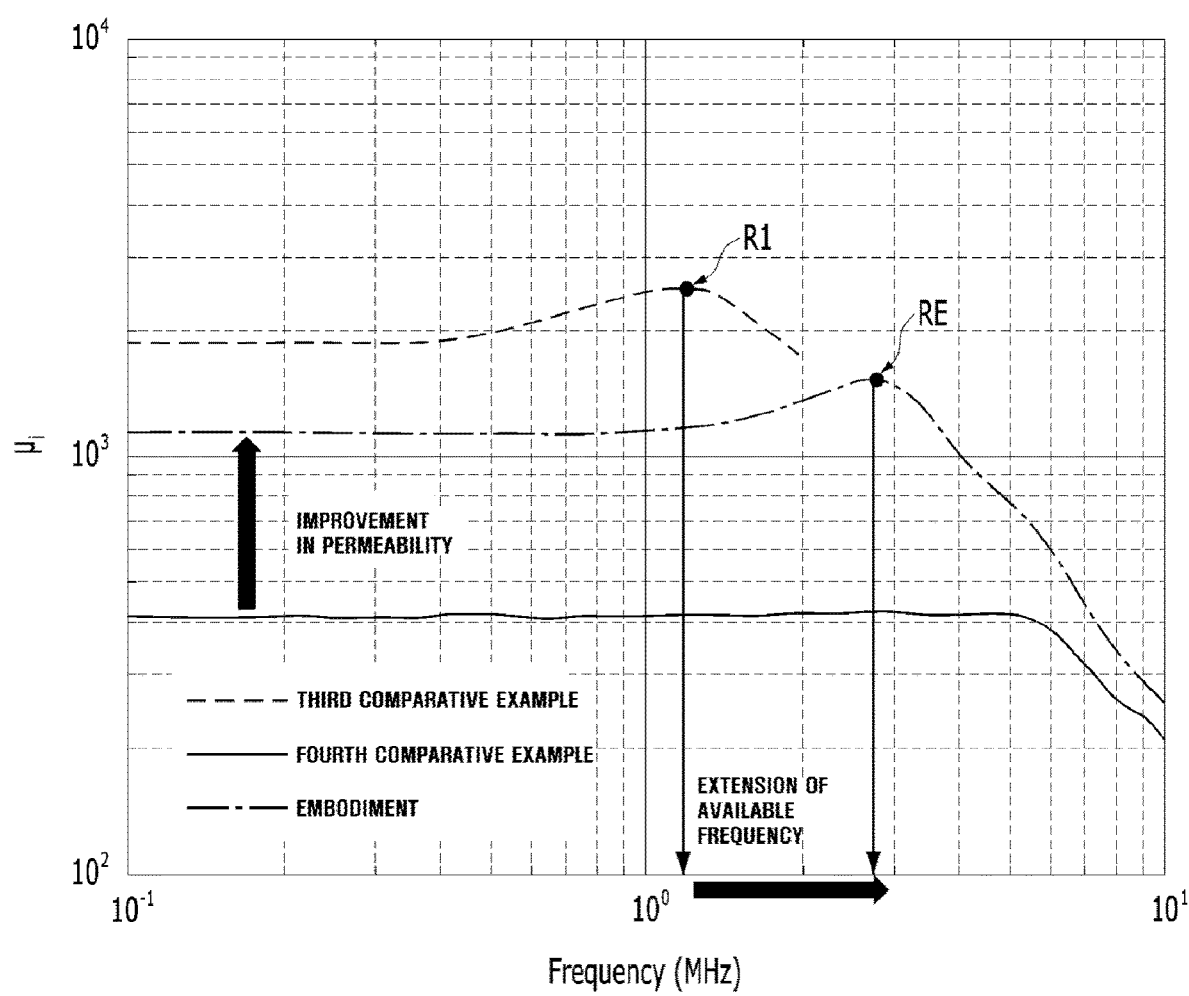
FIG. 7 is a graph illustrating the high-frequency characteristic of a magnetic core according to another embodiment.

FIG. 7 is a graph illustrating the high-frequency characteristic of the magnetic core according to the other embodiment. In FIG. 4, the horizontal axis indicates frequency, and the vertical axis indicates initial permeability (pi).

Referring to FIG. 7, the magnetic core according to the fourth comparative example has relatively uniform initial permeability even at a high frequency of 1 MHz or higher, but the magnitude thereof is about half of that of the third comparative example. In addition, the magnetic core according to the third comparative example has relatively excellent initial permeability at a frequency of 1 MHz or lower, but the performance thereof is abruptly reduced in a MHz range, since the resonance point R1 thereof is located at about 1 MHz. In contrast, it can be seen that the resonance point RE of the magnetic core according to the other embodiment moves farther to a high-frequency region, compared to the third comparative example, whereby the magnetic core according to the embodiment is usable even above a frequency limit point (i.e. 1 MHz), compared to a magnetic core made of a general Mn—Zn-based ferrite material, and reduction in performance due to increase in frequency is small. In addition, the magnetic core according to the other embodiment has low reduction in permeability (about 10%) while having an excellent high-frequency characteristic, compared to the third comparative example, and has permeability equivalent to about twice that of the fourth comparative example.

Consequently, the magnetic core according to the other embodiment is also applicable to a passive device configured to be operated at a high frequency of 1 MHz or higher while having excellent initial permeability Next, direct-current (DC) bias performance will be described with reference to FIG. 8.

Figure 8:
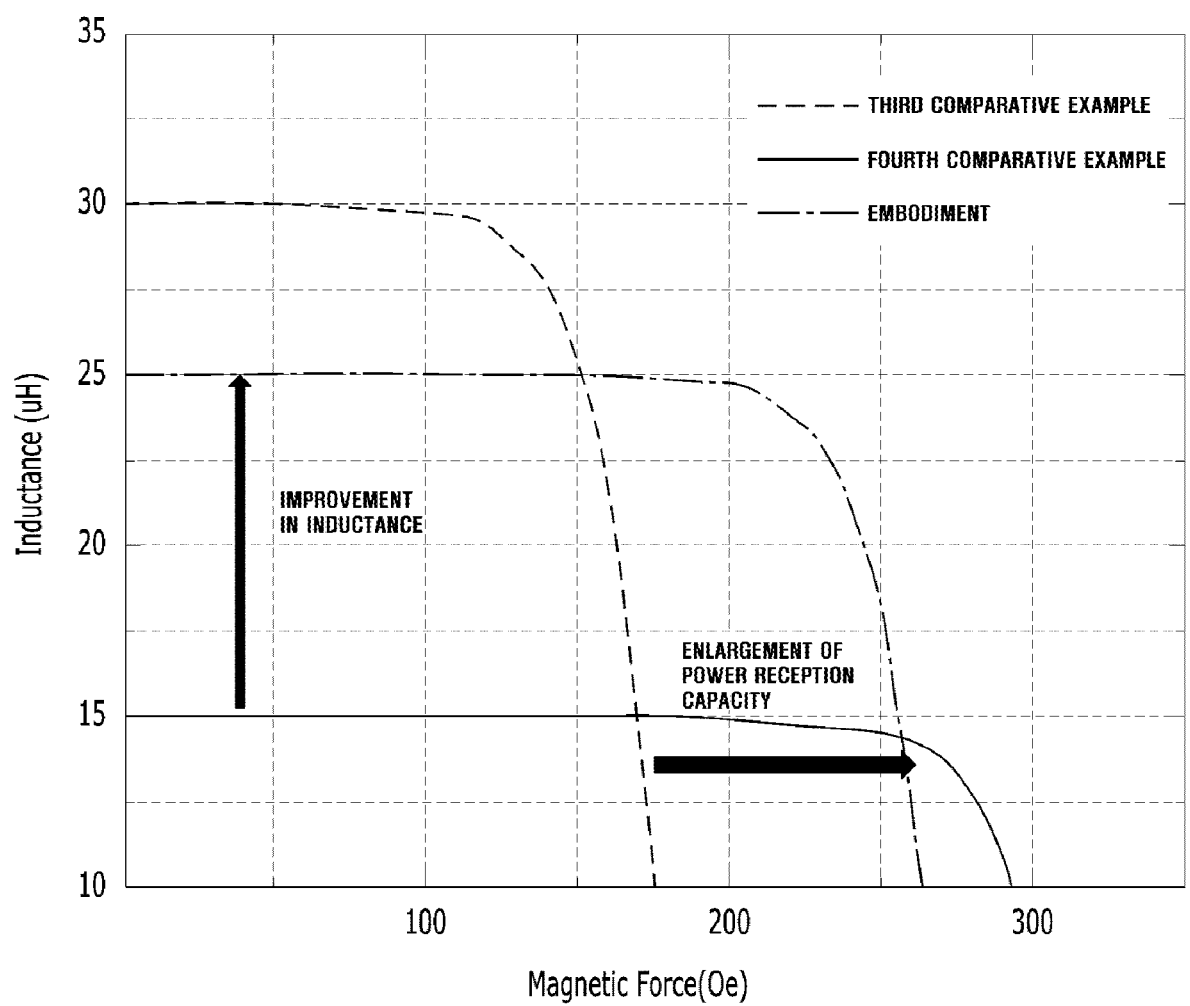
FIG. 8 is a graph illustrating the direct-current bias characteristic of the magnetic core according to the other embodiment.

FIG. 8 is a graph illustrating the direct-current bias characteristic of the magnetic core according to the other embodiment.

In FIG. 8, the horizontal axis indicates magnetizing force, and the vertical axis indicates inductance.

Referring to FIG. 8, the magnetic core according to the third comparative example has relatively high inductance in a specific magnetizing force range (i.e. 150 Oe or lower), but the inductance thereof is abruptly reduced when deviating from the range, whereby power reception capacity is limited. In addition, the inductance of the magnetic core according to the fourth comparative example is maintained even at high magnetizing force; but the value of inductance is very low. In contrast, the magnetic core according to the other embodiment has high inductance within most of the magnetizing force range, compared to the fourth comparative example, and the inductance of the magnetic core is maintained high even within a range of 150 Oe or higher, compared to the third comparative example, whereby the magnetic core according to the other embodiment has excellent inductance within a wide magnetizing force range. In other words, the magnetic core according to the other embodiment has higher inductance than the magnetic core according to the fourth comparative example within a magnetizing force range of less than 250 Oe, and exhibits improved direct-current bias performance within the magnetizing force range, compared to the magnetic core according to the third comparative example.

Meanwhile, one of the losses caused in a passive device in a high-frequency environment is eddy current loss. Since eddy current loss is proportional to the square of frequency, the eddy current loss acts as a predominant loss component in the case in which the frequency used is increased. Consequently, in the aspect of the eddy current loss, low power density in a high-frequency range (e.g. 0.5 MHz or higher) is advantageous. Such a high-frequency loss characteristic will be described with reference to FIG. 9.

Figure 9:
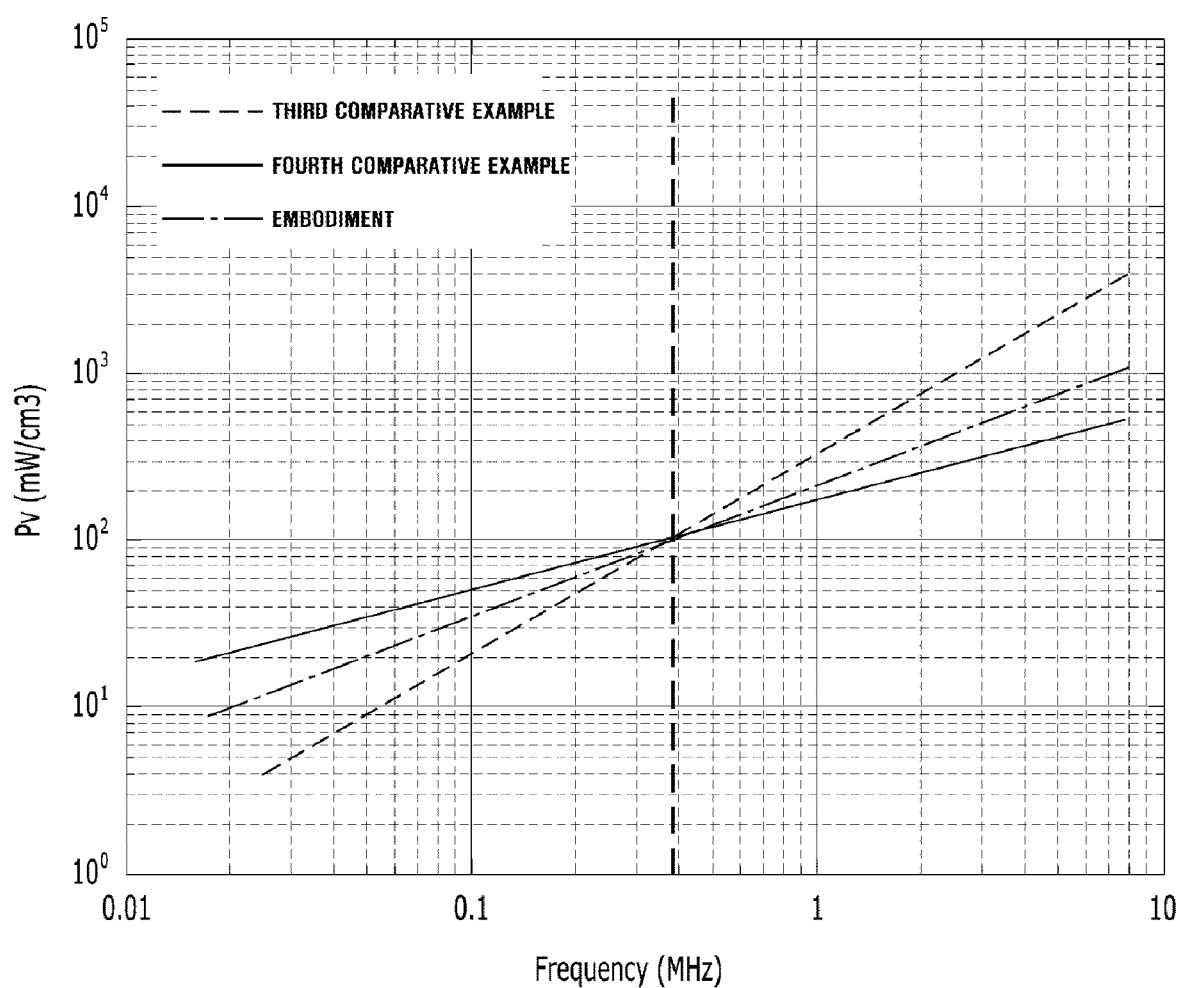
FIG. 9 is a graph illustrating the high-frequency loss characteristic of the magnetic core according to the other embodiment.

FIG. 9 is a graph illustrating the high-frequency loss characteristic of the magnetic core according to the other embodiment.

Referring to FIG. 9, there is shown frequency-based power density of each of the magnetic cores according to the third comparative example, the fourth comparative example, and the other embodiment. In FIG. 9, the horizontal axis indicates frequency, and the vertical axis indicates power density.

As shown, three different power densities intersect each other at about 0.4 MHz. The magnetic core according to the third comparative example exhibits low power density at a low-frequency range based on 0.4 MHz but has high power density at a high-frequency range. Consequently, the magnetic core according to the third comparative example is not suitable for a high-frequency environment. In addition, the magnetic core according to the fourth comparative example exhibits low power density at a high-frequency range but has high power density at a low-frequency range. Consequently, application of the magnetic core according to the fourth comparative example to a range other than a high-frequency range is difficult. In contrast, the magnetic core according to the other embodiment exhibits uniform performance over the entire frequency range, whereby there is little effect due to frequency change in the aspect of eddy current loss.

Advantages of the magnetic core according to the other embodiment described above may be summarized as follows.

A general Mn—Zn ferrite-based magnetic core has a low available frequency, whereas the magnetic core according to the other embodiment also has characteristics of a Ni—Zn ferrite and is thus also applicable to a passive device configured to be operated at a high frequency of 1 MHz or higher.

Also, the inductance of the general Mn—Zn ferrite-based magnetic core is rapidly reduced when exceeding specific magnetic force and thus has low direct-current bias performance, whereas the magnetic core according to the other embodiment also has characteristics of the Ni—Zn ferrite, whereby power reception capacity thereof is increased and thus the magnetic core according to the other embodiment has higher direct-current bias performance.

Also, the magnetic core according to the other embodiment has both Mn—Zn ferrite-based characteristics and Ni—Zn ferrite-based characteristics in the entire frequency range, whereby an operating frequency environment is little affected even in the aspect of eddy current loss.

In addition, a general hybrid core formed by stacking individual magnetic cores made of different kinds of materials has low mechanical strength due to the junction between the different kinds of cores and has magnetic characteristics different depending on the position thereof, whereas the magnetic core according to the other embodiment has a uniform magnetic characteristic and high mechanical strength through microscopic mixing composition.

A description of each of the above embodiments is applicable to another embodiment, unless they conflict with each other.

Although embodiments have been described above, the embodiments are merely illustrations and do not limit the present disclosure, and those skilled in the art will appreciate that various modifications and applications are possible without departing from the intrinsic features of the disclosure. For example, concrete constituent elements of the embodiments may be modified. In addition, it is to be understood that differences relevant to the modifications and the applications fall within the scope of the present disclosure defined in the appended claims.

The invention claimed is:

1. A magnetic core comprising:
67 wt % to 72 wt % of ferrite powder comprising manganese (Mn), zinc (Zn), iron (Fe), and oxygen (O);
28 wt % to 33 wt % of metal-alloy powder comprising at least one of nickel (Ni), and iron (Fe), and at least one of aluminum (Al), molybdenum (Mo), and silicon (Si); and
a nonmagnetic additive,
wherein a difference in molar ratio between the ferrite powder and the metal-alloy powder is less than 5% point, and
wherein the ferrite powder and the metal-alloy powder having micrometer-sized particles are bonded with each other,
wherein the nonmagnetic additive comprises at least one of silicon oxide ($SiO_2$), calcium oxide (CaO), tantalum pentoxide ($Ta_2O_5$), niobium pentoxide ($Nb_2O_5$), and vanadium pentoxide ($V_2O_5$), and
wherein space between the two kinds of particles is filled with the nonmagnetic additive.

2. The magnetic core according to claim 1, wherein the ferrite powder comprises $Mn_{0.67}Zn_{0.23}Fe_{2.09}O_4$, and wherein the metal-alloy powder comprises molybdenum permalloy powder (MPP) ($Ni_{0.79}Fe_{0.16}Mo_{0.05}$).

3. The magnetic core according to claim 1, wherein the metal-alloy powder comprises at least one of FeNi, FeSi, FeAlSi, and NiFeMo.

4. The magnetic core according to claim 1, wherein the magnetic core has a Curie temperature of 300° C. or higher.

5. The magnetic core according to claim 1, wherein the magnetic core has a resonance frequency of 1 MHz or higher.

6. A magnetic core comprising:
first ferrite powder comprising ($Mn_{0.67}Zn_{0.23}Fe_{2.09}O_4$;
second ferrite powder comprising $Ni_{0.6}Zn_{0.4}Fe_2O_4$; and
a nonmagnetic additive,
wherein a difference in molar ratio between the first ferrite powder and the second ferrite powder is less than 5% point,
wherein the first ferrite powder and the second ferrite powder having micrometer-sized particles are bonded with each other,
wherein the nonmagnetic additive comprises at least one of silicon oxide ($SiO_2$), calcium oxide (CaO), tantalum pentoxide ($Ta_2O_5$), niobium pentoxide ($Nb_2O_5$), and vanadium pentoxide ($V_2O_5$), and
wherein space between the two kinds of particles is filled with the nonmagnetic additive.

7. The magnetic core according to claim 6, wherein the magnetic core has a resonance frequency of 1 MHz or higher.

* * * * *